Patented Sept. 4, 1934

1,972,232

UNITED STATES PATENT OFFICE 1,972,232

COMPOUND OF THE CARBAZOLE GROUP

Richard Michel, Crefeld, Germany, assignor to I. G. Farbenindustrie Aktiengesellschaft, Frankfort-on-the-Main, Germany, a corporation of Germany No Drawing. Original application December 3, 1928, Serial No. 323,573. Divided and this application March 18, 1930, Serial No. 436,893. In Germany December 1, 1927

7 Claims. (Cl. 260—46)

The invention relates to new condensation products from olefines and compounds of the carbazole group and to a process of making the same.

I have found that carbazole and the halogeated and/or partially hydrogenated derivatives thereof readily react with olefines in the presence of catalytically acting substances to form alkyl derivatives or higher condensation products thereof.

Among the catalytically acting substances which have been found effective in uniting olefines with the said compounds of the carbazole group are metallic halides particularly aluminium chloride and iron chloride, addition compounds of, say, aluminium halides and olefines and hydrosilicates of large surface, such as fuller's earth, Florida earth, etc. With either of these catalysts there may be combined also other substances capable of promoting the reaction, such as, for example, benzene hydrocarbons and halogen acids.

The action of olefines upon carbazole is further promoted by causing the components to interact in the presence of an inert solvent viz. a solvent which reacts neither with the catalyst used nor the olefine or carbazole. Suitable solvents of this kind are, for example, petroleum ether, petroleum benzine, paraffin oil, or completely hydrogenated aromatic hydrocarbons, such as hexahydrobenzene, hexahydrotoluene, dekahydronaphthalene and the like.

For effecting the condensation of olefines with compounds of the carbazole group it is not necessary to use the former in a pure or very concentrated state; the reaction may be effected with gaseous mixtures containing olefines, such as, for example, the gaseous mixtures resulting from cracking operations, oil gas, and the like.

The conditions of temperature and pressure for carrying out my process may vary within certain limits and depend on the catalyst used. Generally the higher homologues of ethylene, such as propylene, butylene, hexylene, etc., and cyclic olefines, such as cyclohexene, will more readily react than ethylene. The condensation will already take place at atmospheric pressure but advantageously it is accelerated by the application of superatmospheric pressure. The temperature of reaction is found to lie above 50° C. and in particular between 100 and 200° C. the most favorable results are obtained.

The resulting products are alkylated carbazoles or, by more intensified action, higher condensation products thereof. According to the relative proportions of the olefine and compounds of the carbozole group one or more moles of olefine combine with the compound of the carbazole group to form mono- or polyalkylated derivatives or higher condensation products of oily or resinous nature. Those alkyl derivatives wherein some of the alkyl groups contain more than one carbon atom, as well as all the higher condensation products have not been hitherto known.

The invention is illustrated by the following examples but not restricted thereto. The parts are by weight.

Example 1

In an autoclave 334 parts of carbazole and 35 parts of fuller's earth (previously treated with a mineral acid, for example, hydrochloric acid, and dried at about 100° C.) are stirred with propylene gas under a pressure of about 15 atmospheres and at a temperature of about 150° C., until an increase in weight of 130 parts is attained. The hot reaction product is filtered and distilled under 1 mm. pressure (mercury gauge). Besides some unchanged carbazole there is obtained an odorless nearly colorless soft resinous body boiling from 210 to 240° C. at a pressure of 1 mm. (mercury gauge).

Example 2

334 parts of carbazole and 17 parts of anhydrous aluminium chloride are stirred with propylene gas under a pressure of about 12 atmospheres and at a temperature of from 90 to 100° C. until 240 parts of propylene have been absorbed. The reaction product is washed with water and distilled under 1 mm. pressure (mercury gauge); a clear colorless soft resin is obtained.

Example 3

334 parts of carbazole suspended in 400 parts of dekahydronaphthalene and 16 parts of anhydrous aluminium chloride are stirred with propylene gas under atmospheric pressure and at a temperature of about 100° C., until in the course of about 3 hours an increase in weight of about 160 parts is attained. After washing with water, besides some unchanged carbazole, a clear light colored resin is obtained boiling from 210 to 220° C. under a pressure of 1 mm. mercury. The resin may be regarded as a diisopropyl carbazole or a polymer thereof. Analysis gives the following results:

| | | | |
|---|---|---|---|
| C found | 86,17% | C calculated | 86,05 |
| H (found) | 8,84% | H calculated | 8,36 |
| N found | 5,43% | N calculated | 5,56 |

Molecular weight found 251, calculated 251.

Example 4

334 parts of carbazole, 400 parts of dekahydronaphthalene and 35 parts of fuller's earth are stirred with propylene gas under a pressure of about 15 atmospheres and at a temperature of from 130 to 150° C., until an increase in weight of about 250 parts is attained. After washing with water and distilling off the dekahydronaphthalene, distillation under 1 mm. pressure (mercury gauge) yields a clear colorless resin similar to that obtained in Example 2.

In the following claims the generic term "compound of the carbazole series" is used to denote compounds of the group consisting of carbazole, the homologues, the halogenated and/or partially hydrogenated derivatives thereof, insofar as they are able to react with olefines under the conditions described and claimed to form alkylated derivatives which contain the carbazole nucleus at least once.

This application is a division of my copending application Ser. No. 323,573, filed December 3, 1928, now matured in the U. S. Patent 1,916,629.

I claim:

1. The process which comprises reacting with an olefine upon a compound of the carbazole series in the presence of a catalytically acting metallic halide selected from the group consisting of aluminum chloride and iron chloride, and at a temperature of at least 50° C. to about 200° C.

2. The process which comprises reacting with an olefine upon a compound of the carbazole series in the presence of a catalytically acting metallic halide selected from the group consisting of aluminum chloride and iron chloride and of an organic solvent inert to the substances participating in the reaction, and at a temperature of at least 50° C. to about 200° C.

3. The process which comprises reacting with an olefine upon a compound of the carbazole series in the presence of a catalytically acting metallic halide selected from the group consisting of aluminum chloride and iron chloride, and at a temperature of at least 50° C. to about 200° C., and under at least normal atmospheric pressure.

4. The process which comprises reacting with a higher homologue of ethylene upon carbazole in the presence of a catalytically acting metallic halide selected from the group consisting of aluminum chloride and iron chloride and of an organic solvent inert to the substances participating in the reaction, and at a temperature of from about 100° C. to about 200° C. and under at least normal atmospheric pressure.

5. The process which comprises reacting with propylene upon carbazole in the presence of a catalytically acting metallic halide selected from the group consisting of aluminum chloride and iron chloride and of an organic solvent inert to the substances participating in the reaction, and at a temperature of from about 100° C. to about 200° C. and under at least normal atmospheric pressure.

6. The process which comprises stirring 334 parts of carbazole and 17 parts of anhydrous aluminum chloride with propylene gas under a pressure of about 12 atmospheres and at a temperature of from 90 to 100° C. until 240 parts of propylene have been absorbed, washing the reaction product with water and distilling it under 1 mm. pressure.

7. The process which comprises stirring a mixture of 334 parts of carbazole, 400 parts of dekahydronaphthalene and 16 parts of anhydrous aluminum chloride with propylene gas under atmospheric pressure and at a temperature of about 100° C. until in the course of about three hours an increase in weight of about 160 parts is attained, washing the reaction product with water and subjecting it to a distillation under a pressure of 1 mm.

RICHARD MICHEL.